United States Patent Office 3,369,441
Patented Feb. 20, 1968

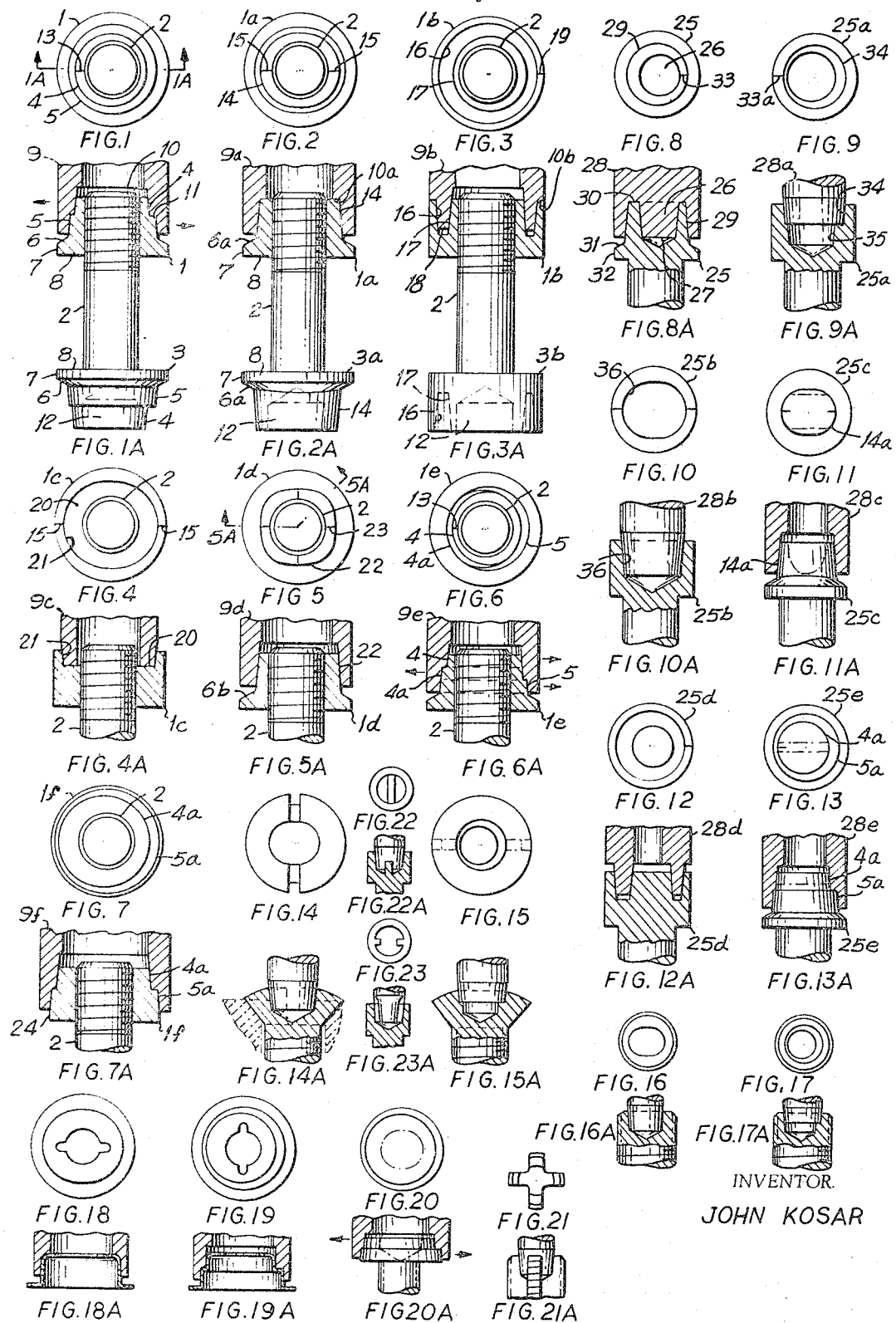

3,369,441
FASTENER WITH TAPERED TOOL
ENGAGING SURFACES
John Kosar, c/o Anchor Engineering Co., 29—09 Bridge Plaza North, Long Island City, N.Y. 11101
Continuation-in-part of application Ser. No. 324,804, Nov. 19, 1963. This application May 4, 1966, Ser. No. 547,624
10 Claims. (Cl. 85—45)

This application is a continuation-in-part of the parent application, Ser. #324,804, filed November 19, 1963, and now abandoned.

This invention relates to fasteners and more particularly to elements of fasteners, such as nuts, heads of bolts and screws, sheetmetal nuts, headless (set) screws, pipe and tank plugs, cap nuts, etc. It also relates to coupling or clutching means for wrenching the fasteners by which one or more cooperating lateral surfaces of both are wedgedly locked to induce rotation of a fastener in unison with the coupling means.

One object of the invention is to provide both the fastener and the clutching means with a shape and form suitable for coupling and wrenching the fastener, and wherein one is provided with a socket for engagement of the other so that both are more or less frictionally locked to each other in their normal assembled position upon urging a partial rotation of one relative to the other, or both may be frictionally locked in their assembled position by only a forced axial engagement. For example, a nut may be frictionally held by the coupling or wrenching tool for aiming at a threaded engagement with a bolt, or the bolt-head held for threaded engagement of the shank with the nut, or a screw head or headless screw-end held for threaded engagement of the shank with a hole.

On the other hand, a nut may also be manually initially engaged with a bolt, or a screw initially engaged with a threaded hole and then the coupling or wrenching tool applied for tightening. The tool may then be left in frictional engagement with the nut or head or removed therefrom either by torquing in the unscrewing direction or by a torquing and pulling. In the latter case it is essential that the resistance to loosen and remove the wrenching tool be less than the resistance offered to unscrew the nut or screw.

A second object is to provide a fastener either with an eccentrically offset cylindrical or with a more or less tapered- or conical-surface (or surfaces) for engagement by a corresponding surface (or surfaces) of a wrenching tool. In the former, a partial relative rotation of a nut or head locks both to each other while in the latter a frictional grip of the nut or head may be obtained by just an axial wedging engagement with the tool and without requiring an initial relative rotation. A cylindrical surface engagement requires an assembly clearance resulting in a smaller or greater backlash depending on the amount of clearance provided, while with a tapered surface engagement the clearance between tool and fastener diminishes to practically zero at their full axial engagement, thereby reducing or eliminating the backlash upon torquing the fastener for tightening or removal. Increasing the taper facilitates disengagement and withdrawal of the tool following the tightening of the fastener. On the other hand, a tapered surface engagement may be limited in order to provide a backlash. This limitation may be provided by a built-in stop in the coupling or tool.

As a third object, the upper portion of a nut and bolt head may be provided with:

(1) An upper external surface which is eccentric to the axis of the nut or bolt head and an adjoining lower external surface which is concentric to the axis.

(2) An oblong circular or elliptical surface which is coaxial with the nut or bolt head.

(3) An eccentric annular socket or recess in top.

(4) A coaxial oblong socket in top.

(5) A square-shaped cross sectional surface having rounded corners.

(6) Two eccentric upper surfaces joined by a lower concentric surface.

All of the above surfaces (items 1–6) are engaged by corresponding features in wrenching tool, and the engaged surfaces of both fastener and tool may either be tapered or conical as shown or parallel with the axis such as being cylindrical while the lowermost portion of nut and bolt head may be with or without a flange. In the former the wrenching tool may be flush with the flange edge.

The heads of screws may have:

(1) An eccentric annular wall produced by an eccentric socket or recess.

(2) A socket which upper half is concentric and its lower half eccentric to the axis of head.

(3) A coaxial oblong or elliptical socket.

(4) A coaxial oblong or elliptical external shape.

(5) An eccentric annular socket or recess in top. The socket is defined by a major concentric and a minor eccentric internal side surface.

(6) An upper external surface which is eccentric to the axis of head and an adjoining lower surface which is concentric with the axis.

A second upper eccentric surface may be added similar to that in item 6 for bolt heads.

The wrenching tool to have surfaces corresponding to that of the head, and the surfaces may be tapered or conical as shown, or be parallel with the axis, such as being cylindrical, while the lowermost portion of head may be with or without a flange. In the former the wrenching tool may be flush with the flange edge.

Headless screw-ends may either have an oblong or an eccentrically offset socket similar to item 2. The oblong surfaces may instead be elliptical. Items 3 and 4 may instead be square shaped with rounded corners. By oblong is meant two spaced semi-circles which ends are connected by an intermediate straight line, or it may be a more or less flattened circle.

A forth object is to provide proprietary fasteners, which because of their unique wrenching features are also tamperproof since conventional wrenching tools cannot be employed.

A fifth object is to make the fastener not only of metal but also of hard plastic, etc., and the above listed features may be employed not only in screw-type fasteners as shown but also for other articles such as caps for cases or containers, or for locking a part to another part either temporarily or permanently.

Another object is to provide the skirt of flanged sheetmetal cap nuts with a circularly oblong outline, or the upper skirt portion may be eccentrically offset from the lower skirt portion. Both outlines be engageable by a corresponding outline of a socket wrench.

Another object it to make the coupling wrenches shown either of solid, tubular or only the end portions tubular (or with a recess), and one or both wrench ends may be shaped for wrenching either the same or two different sizes of fasteners. The longitudinal wrench bodies may be bent to an L-shape to provide a handle or the wrench or coupling bodies may be left straight and then provided with a collar and handle. As alternative the wrench body may be provided with a transverse hole for insertion of a cross pin. The wrench or coupling ends may also be pressure-formed or machined and hardened. (See also summary.)

The above and other objects, features, and advantages of my present invention will become more readily apparent from the following description, reference being made to the accompanying drawing in which:

FIG. 1 represents a top view of a nut on a bolt shown in FIG. 1A. An end view of bolt head in FIG. 1A would be similar.

FIG. 1A is a sectional side view of the nut on the bolt, on line 1A—1A of FIG. 1, except shown in engagement with a coupling or wrench shown in section, while the bolt and bolt head are shown in an elevational view.

FIGS. 2 and 2A represent a top view, section, and side view similar to FIGS. 1 and 1A except in a modified form.

FIGS. 3 and 3A represent a top view, section, and side view similar to FIGS. 1 and 1A except in a modified form.

FIG. 4 is a top view of FIG. 4A (less tool) and FIG. 4A is a sectional side view of FIG. 4 except with tool (in section).

FIG. 5 is a top view of FIG. 5A (less tool) and FIG. 5A is a sectional side view of FIG. 5 except with tool (in section).

FIG. 6 is a top view of FIG. 6A (less tool) and FIG. 6A is a sectional side view of FIG. 6 except with tool (in section).

FIG. 7 is a top view of FIG. 7A (less tool) and FIG. 7A is a sectional side view of FIG. 7A except with tool (in section).

FIG. 8 is a top view of a screw head (less tool) and FIG. 8A is a sectional side view of the head except with tool (shown in section).

FIGS. 9 and 9A, 10 and 10A have a top view (less tool) and a sectional side view (with tool in side view).

FIGS. 11 and 11A, 13 and 13A have a top view (less tool) and a side view (with tool in section).

FIGS. 12 and 12A are similar to FIGS. 8 and 8A.

FIG. 14 is a top view (less tool) of FIG. 14A shown in section except with tool in side view, and FIG. 15 a top view (less tool) of FIG. 15A shown in section except with tool in side view.

FIG. 16 is a top view (less tool) of FIG. 16A shown partially in section (except with tool in view) and FIG. 17 a top view (less tool) of FIG. 17A shown partially in section except with tool in view.

FIG. 18 is a top view (less tool) of FIG. 18A shown in section with tool, and FIG. 19 a top view (less tool) of FIG. 19A shown in section with tool.

FIG. 20 is a top view (less tool) of FIG. 20A shown in side view (except with tool in section) and FIG. 21 is a top view (less tool) of FIG. 21A shown in side view (with tool). FIGS. 22 and 23 are top views of FIGS. 22A and 23A.

Following is a detailed description of the drawings in which similar reference characters refer to similar parts throughout the several views.

FIGS. 1–7A illustrate nuts and headed bolts of same nominal size except with different coupling features for wrenching.

FIGS. 1 and 1A illustrate a nut 1 in threaded engagement with a bolt 2 having a head 3. Both the nut and the head are provided with a slightly conical upper side surface 4 which is eccentric to their axis, and with an adjoining slightly conical lower side surface 5 of a larger diameter but which is concentric to their axis. The latter surface being defined at bottom by a bevel 6 of a concentric flange 7 having a base 8. Both surfaces 4 and 5 of nut 1 (in FIG. 1A) are shown engaged by corresponding internal surfaces of a tubular coupling or wrenching tool 9 which O.D. is shown flush with the edge of flange 7. Line 10 defines an offset recess in tool 9 thereby allowing the tool engagement to be limited by the offset 11 of nut and which offset divides the surfaces 4 and 5. Offset 10 may instead make contact with top of nut to thereby limit the engagement of tool for a clearance fit or a lesser snug fit with nut or the tool end may instead make contact with upper face of flange. Nut and head are of same size for interchangeable wrenching by tool 9. The head 3 may have a central bore 12 to lighten its weight and save on material in the cold heading process. A radial line 13 may be scribed at end of both the nut and head to indicate the max. throw of the eccentric conical surface 4, in order to facilitate the engagement of wrenching tool having a corresponding scribed line at its wall-end surface and also at its peripheral surface and axial direction thereof. The engagement of the coupling or wrenching tool may be stopped by offset 11 or be stopped slightly ahead of the offset if a snug or a wedging fit is desired with the nut and head. The conical surfaces 4 and 5 of nut and head may instead be cylindrical in which case it is essential that the diameter of corresponding internal surfaces of the tool be slightly greater.

The taper of the conical surfaces 4 and 5 may be 5° as shown, or be less or more to suit the ease of disengagement or binding desired with the tool. The eccentricity may be about 1/32 as shown, resulting in a throw of 1/16. The amount of eccentricity may be decreased to suit a snug taper or conical fit with a minimum or zero backlash, or increased for a greater backlash. If surfaces 4 and 5 are made cylindrical it automatically results in a greater backlash due to the required assembly clearance and the absence of the axial wedging action. Depending on the amount of assembly clearance the eccentricity may be increased or decreased. A greater backlash automatically increases the circular wedging hold for same amount of torque used and this due to the greater impetus. Having the nut held by the coupling or wrenching tool is a convenient way for engaging it with the bolt and the same is true if the head is held by the tool for engaging its bolt or shank with the nut. The tool is locked with the nut by a diagonal opposite wedging action as indicated by arrows, upon a partial rotation of the tool relative to the nut. Surface 4 may instead be concentric and surface 5 eccentric with the axis of nut or bolt.

In FIGS. 2 and 2A, the nut 1a and bolt head 3a are similar to that in FIGS. 1 and 1A except that the surfaces 4 and 5 are replaced by an oblong and tapered surface 14, for engagement with a corresponding internal surface of a tubular tool 9a. As a result of the oblong surface 14 the bevel 6a is slightly curved as indicated in head 3a. The engagement of the tool 9a may be limited by its offset 10a, or the offset may be spaced from the nut or head to permit a full engagement of the tool with the head or nut. Two opposite radial lines 15 may be scribed in wall top of nut and head for aligning the tool for engagement therewith. The outer periphery of the tool may have a corresponding line scribed in axial direction.

In FIGS. 3 and 3A the nut 1b and head 3b are both cylindrical and their top surfaces provided with an annular socket defined by a concentric major and tapered wall-surface 16, and by an eccentric minor and tapered wall-surface 17. The (annular) socket in nut is shown engaged by a corresponding annular projection 18 of a tubular wrenching tool or coupling 9b provided with an offset surface 10b serving to limit the engagement of tool, or the offset surface may be spaced from the outer top surface of nut and head so as to permit full engagement of tool. A radial line 19 may be scribed in outer wall top of nut and head for aligning the tool for engagement therewith. The outer periphery of tool may have a coinciding line scribed in axial direction. The major diameter wall surface 16 may instead be eccentric and the minor diameter wall surface 17 concentric to the axis of nut and head.

FIGS. 4 and 4A illustrate a cylindrical nut 1c in threaded engagement with a bolt 2. The top surface of nut is provided with a recess 20 having an oblong tapered internal wall-surface 21 for engagement with a corresponding external surface of a tubular tool 9c. The bolt head (not shown) is to have an identical recess for fitting the same tool 9c. The tapered surfaces may instead be parallel to the axis. Radial lines 15 may be scribed for alignment of tool with nut. The oblong wall surface 21 of recess 20 may instead be an upper concentric and tapered surface, and a lower, eccentric and tapered surface of smaller diameter for engagement by a corresponding plug tool.

FIGS. 5 and 5A illustrate a nut 1d which is similar to that in FIGS. 2 and 2A except that the oblong outline is replaced by a square shaped outline 22 having (as shown) rounded corners and tapered sides for engagement by a corresponding internal surface of tubular tool 9d. The tool may have an internal offset either spaced or in contact with top of nut depending on whether a loose or close fit with nut is desired. The bolt head (not shown) is to have an identical wrench-engaging surface. The tapered sides may instead be parallel with the axis. Four radial lines 23 may be scribed as shown for alignment of tool with the nut.

FIGS. 6 and 6A illustrate a nut 1e similar to that in FIGS. 1 and 1A except that the upper eccentric side surface 4 and the lower eccentric side surface 4a are joined by an intermediate concentric surface 5 for engagement of corresponding internal surfaces of a tubular coupling or tool 9e. A radial line 13 may be scribed in top of nut as shown for aligning the tool which may have a corresponding line scribed in axial direction at the periphery thereof. The same applies to the bolt head. Surfaces 4 and 4a may instead be concentric and surface 5 eccentric.

FIGS. 7 and 7A illustrate a nut 1f which is similar to that in FIGS. 1 and 1A except without a flanged base. The upper eccentric surface 4a and the lower concentric surface 5a are, therefore, both larger in diameter and the concentric tapered surface 5a blends with the narrow cylindrical surface 24 in place of a flange. Surfaces 4a and 5a are engaged by corresponding internal surfaces of a tool 9f. The O.D. of tool extends beyond the O.D. of nut because of the absence of a flange in nut. The bolt head to be identical in size and shape for interchangeable use of tool 9f. This flangeless nut may instead have an oblong circular tool engaging outline similar to that in FIG. 2A.

FIGS. 8–13A illustrate heads of cap screws of same nominal size but with different coupling or clutching surfaces for holding and wrenching same.

In FIGS. 8–8A, the head 25 is provided with a conical eccentric socket 26 for engagement of a corresponding plug 27 of a coupling tool 28. The socket is defined by a wall having a concentric, conical external surface 29 for engagement of a corresponding internal surface of a tubular wall of tool 28, and which tubular wall is connected by a horizontal surface 30 with plug 27. Surface 30 is shown in contact with head 25 to limit the insertion of tool 28, or it may be spaced therefrom to allow a full engagement thereby decreasing its angular backlash to zero or nearly that. The external surface 29 is defined by a bevel 31 of a base flange 32 shown flush with the O.D. of tool 28. The bevel may be replaced by a square corner. A radial line 33 is scribed in top of head and a corresponding axial line may be scribed at the periphery of tool for aligning it for engagement with head.

FIGS. 9–9A illustrate a cylindrical cap screw head 25a having a socket defined by an upper concentric and tapered surface 34 joined by a lower eccentric and tapered surface 35 for engagement with corresponding surfaces of a tool 28a. A radial line 33a serves to align the tool.

(The nut in FIGS. 4–4A may have instead a recess having an internal lateral wall surface similar to that in screw head FIGS. 9–9A.)

In FIGS. 10–10A the head 25b is similar to that of FIGS. 9–9A except that the socket is defined by an oblong circular, coaxial and tapered internal wall-surface 36 shown engaged with a corresponding plug of a tool 28b. As shown, two diametrically opposite radial lines are scribed in top of head for alignment of tool for its insertion. This oblong socket is similar to that in FIGS. 4–4A.

In FIGS. 11–11A the flanged head 25c is similar to that in FIG. 2A and provided with a plug portion having an oblong circular outline with a tapered side surface 14a shown in engagement with a corresponding internal surface of a tubular tool 28c having an internal offset horizontal surface shown spaced from top of head, but may be made to contact the head if a loose engagement of tool is desired. Two opposite radial lines may be scribed in top of head, as shown for alignment of tool.

The oblong outline of head is coaxial with the flange and shank of screw. The spaced semi-circular oblong outline of top surface of head may instead be a concentric circular outline except a portion cut away at diametrical opposite sides so as to result in two parallel lines at top surfaces as indicated in phantom and taper downwardly and outwardly to result in two opposite nonparallel flat surfaces as indicated in phantom in FIG. 11A. However, both the opposite circular surfaces and the opposite flat surfaces transverse thereto may instead be parallel to the axis of head. The nut and head in FIG. 2 may also be similar in shape. The coupling or tool to correspond to a given shape of head.

In FIGS. 12–12A, head 25d is shown with an annular socket similar to that in FIGS. 3–3A wherein the socket is defined by a major concentric and minor eccentric tapered lateral wall surface shown engaged by a corresponding tool 28d.

In FIGS. 13–13A the flanged head 25e is similar to that of FIGS. 1–1A in that an upper, eccentric, conical surface 4a is joined by a lower concentric, conical, but larger diameter surface 5a. An optional screw driver slot may be added as shown in phantom. The slot may be as shown or transverse thereto. A similar slot may also be added in FIGS. 11–11A.

FIGS. 14–15A illustrate two oval head machine screws wherein the head in FIGS. 14–14A is provided with an oblong socket similar to that of the cap screw in FIGS. 10–10A. The tapered wall surface of socket extends to a depth about equal to the conventional screw driver slot shown and which slot and socket offer a choice of either a screw driver or a clutching plug tool. The oblong plug tool may be inserted by hand and a manual twist of the screw locks the head with the tool. The screw may then be wrenched for threaded engagement with a hole. The oblong outline is formed by two semicircular conical surfaces spaced from each other on amount sufficient to cause locking of the head with the tool and yet permit separation without difficulty. The portion between the semicircular outline may have the same taper as that of the semicircular outline.

The socket in FIGS. 15–15A is similar to that of the cap screw in FIGS. 9–9A. A slot as shown in phantom may be added for an optional use of a screw driver. The slot may be as shown or transverse thereto.

FIGS. 16–17A illustrate two headless screw ends wherein the one in FIGS. 16–16A is provided with an oblong tapered socket similar to that in FIGS. 14–14A for locking engagement with a plug tool while the socket in FIGS. 17–17A is made similar to that in FIGS. 15–15A for clutching engagement with a corresponding plug tool which may be tubular for larger diameter of screws.

FIGS. 18–19A illustrate two flanged sheetmetal cap-nuts wherein the one in FIGS. 18–18A is provided with an oblong circular skirt, and the one in FIGS. 19–19A provided with an upper eccentric skirt portion joined by a lower concentric skirt portion. Tubular tools with corresponding internal surfaces are shown in engagement with both 18A and 19A. The lateral surfaces in FIGS. 18–19A may be tapered or parallel to the axis of cap nut.

FIGS. 20–20A illustrate a pan head machine screw having its upper peripheral head portion eccentrically offset for locking and driving engagement with a corresponding tubular tool. The eccentric offset may be replaced by an oblong socket as indicated in phantom, or the oblong socket may be added to the eccentric offset. All lateral surfaces may be either tapered, cylindrical or parallel to the axis.

FIGS. 21–21A illustrate a cross bar having threaded peripheral edges to serve as a special purpose screw. As shown, a tapered oblong socket or recess may be provided for clutching a corresponding tool for retention and wrenching. A two or four pin-wrench may be used in place of the plug wrench.

FIGS. 22–22A and 23–23A illustrate each a tapered or conical socket provided in the screw heads for a frictional retaining fit with a plug tool except that the bottom of socket in FIGS. 22–22A is provided with a diametrical key projecting therefrom for engagement with a corresponding diametrical slot provided in tool-end for wrenching the head, while in FIGS. 23–23A the lateral surface of socket is provided with a pair of diametrically opposite keys for engagement of corresponding slots formed in the plug-tool for wrenching the head. Accordingly, a frictional or wedging fit of plug tool is capable of keeping a screw suspended for threaded engagement with an object while the keys serve to lock the tool against relative rotation for wrenching the screw head. For larger heads the diametrical key in bottom of socket may be replaced by crosswise arranged keys for engagement of corresponding slots in tool and the pair of diametrically opposite keys in FIG. 23 may instead be crosswise arranged. The socket may be provided with both lateral keys and a key or keys at bottom of socket. The sockets may instead be cylindrical. Either the flanks of key in FIG. 22A, or the flanks or ridges of keys in FIG. 23A may instead be in frictional engagement with a corresponding slot or slots in tool to thereby retain the screw.

Summary, additional objects and remarks

By "oblong" is meant a symmetrical outline formed by two spaced semicircles connected by intermediate lines of equal breadth. It may be compared with a hose or tubing pinched, or more or less compressed at diametrically opposite sides in lengthwise direction so as to result in an end outline which is oblong like a rectangle with rounded ends or similar to a somewhat flattened circle. The binding or locking action of tool with fastener may be reduced by one or more of the following:

(1) Increase the oblongness.
(2) Increase the angle of taper (or conical surface).
(3) Decrease depth of tool engagement.
(4) Use of an elliptical or oval outline.
(5) Increase of eccentric offset.

The square-shaped outline in FIG. 5 may instead be triangular, pentagonal, hexagonal, octagonal, etc., and each provided with rounded corners sufficient to result in a frictional hold with the tool, or as desired. The bevel in flanges may be replaced by a square corner. For clarity's sake only the outline of the upper edges of tapered or conical surfaces of sockets or plug bodies have been shown on the drawing.

In FIGS. 1–1A the surface 4 may instead be concentric with bolt and surface 5 eccentric.

The outside diameter in FIG. 10, etc., may instead be oblong.

In FIGS. 4–4A the oblong clutching surface may be replaced by an eccentrically offset surface similar to that in FIG. 9A. Larger sizes of nuts may have a concentric wall extension surrounding and engaging the bolt but clearing the tool.

In FIGS. 1, 2, 4 (if necked), etc., the uppermost portion of nut may be somewhat laterally compressed or flattened at diametrically opposite points so as to result in a binding thread interference for locking the nut to the bolt or prevent its loosening. The top of nut may instead be notched.

In FIGS. 16–17A the screw may be a pipe plug, and the external wrenching of the pan head in FIG. 20A may also be used on a jam nut. The lateral tool engaging surfaces of socket in FIGS. 16A and 17A may instead be that of a male or plug-like portion projecting from the top end of screw.

The screw in FIGS. 21–21A may instead have 3 or more than 4 legs.

The flat blanks for the cap nuts in FIGS. 18–19A may be that of a polygonal outline such as a square or triangular blank with truncated corners or it may be a hexagonal or octagonal blank, and which polygonal blank would result in a substantial saving of material as illustrated in my pending application, Ser. No. 337,880, filed January 15, 1964 and now abandoned.

The oblong outlines of sockets shown on the drawing may be compared with a rectangular slot having semi-circular ends, or the outline of the oblong socket in FIG. 10 and likewise the oblong outline of head in FIG. 11 may instead be a rectangular outline except with each of the four corners rounded sufficient to result in a frictional hold with the tool upon a forced angular movement of one relative to the other or be similar to that in FIG. 5. However, a rectangular slot with semi-circular ends may be sufficiently long and permit a free insertion and a relative rotation of tool without resulting in a frictional hold with the head. A head may have a concentric circular top surface except provided with a pair of opposite flats and both the circular ends and flats may be parallel or tapered to the axis. The junction of each flat surface with the end of a conical surface is to be arced and each arc to be tangent to both said surfaces.

As per Marks Handbook: "Clutches are couplings providing for convenient disengaging of the coupled shafts during rotation." In comparison, my clutches are couplings providing for convenient disengagement of the coupled fastener following torquing of the tool in the unscrewing direction of the fastener with or without an axial pull or by only an axial pull of the tool.

From a simplicity and functional standpoint, the preference may be placed on oblong outlines and eccentrically offset circular outlines of both sockets and plug-shaped heads and nuts. The dimensions of external and internal coupled surfaces of nuts and heads may remain the same for two or more nominal sizes of heads, nuts and screw ends in order to be wrenchable by the same coupling or tool.

The circularly oblong or oval cross-sectional outline of head in FIG. 11 may instead be that of a square or rectangularly shaped outline having convex or rounded corners similar to that of the nut in FIG. 5; or the cross-sectional outline may be a triangle having convex or rounded corners thus ▽. The same applies to the sockets in heads of FIGS. 10, 14, 16 and 20, wherein the cross-sectional outline of socket of either one figure may be square, rectangular or triangular with concave corners; or the cross-sectional outline of socket of heads in FIGS. 10, 14, 16 and 20 may be that of a crosswise arranged circularly oblong or oval intersectional outline, thus ⟡. The oblong head in FIG. 11A may, in addition, have an oblong socket arranged to result in a uniform cross sectional wall thickness, or a polygonal outline of a head such as in FIG. 5 may, in addition, have a like socket. The same applies to a triangular round cornered outline. Likewise the head in FIG. 13A may have a like socket arranged so as to result in a uniform cross sectional wall thickness in the upper portion of head.

Since certain changes may be made in the articles described and different embodiments of the inventions may be incorporated without departure from the scope thereof, it is intended that all matter contained in the above description or shown in the accompanying drawing shall be interpreted as illustrative and not in a limiting sense.

Having thus described my invention, I claim:

1. In a fastener having a head portion defined by a top surface, said head portion having a central axis and is provided with a plurality of circumferentially disposed driving tool engaging surfaces which are taperingly inclined to the axis of said head portion, and said taperingly inclined driving tool engaging surfaces comprise at least two frusto-conical driving tool engaging surface portions having each an axis of revolution and which axes of revolution are spaced from and parallel to each other so as to provide relative to the central axis radially eccentrically offset frusto-conical portions, and each of said frusto-conical driving tool engaging surface portions provides a rotary driving tool holding wedging surface region which is angularly spaced from the adjacent other driving tool holding wedging surface region, and said frusto-conical driving tool engaging surface portions permit a close driving tool engaging fit so as to produce a tool holding wedging action through a limited rotation of said tool relative to said frusto-conical tool engaging surfaces, hence a relative minimum spacing of said axes of revolution is required.

2. The fastener as in claim 1 wherein said frusto-conical surface portions are situated externally of said head portion.

3. The fastener as in claim 1 wherein said frusto-conical surface portions are situated internally of said head portion thereby forming a socket having a bottom defining the depth of said tool engaging surfaces.

4. The fastener as in claim 1 wherein said head portion terminates in a lower end provided with an annularly projecting flange forming an upper face defining said tool engaging surfaces and a lower face forming a bearing surface for said head portion.

5. The fastener as in claim 1 wherein the included angle with respect to the axis of revolution of each of said frusto-conical tool engaging surface portions is substantially equal to 360° divided by the number of said portions, and said frusto-conical surface portions are spaced from each other and connected by substantially flat surfaces.

6. The fastener as in claim 1 wherein said head portion is provided with four substantially equi-angularly spaced frusto-conical tool engaging surface portions.

7. The fastener as in claim 1 wherein said head portion is provided with two radially eccentrically offset frusto-conical surface portions and wherein one of said frusto-conical surface portions is concentric with, and the other eccentric and parallel to the axis of said head portion.

8. The fastener as in claim 7 wherein said head portion is provided with three radially eccentrically offset frusto-conical surface portions of which two are concentric with and one eccentric to the axis of said head portion.

9. The fastener as in claim 1 wherein said head portion is provided with two diametrically opposite and spaced frusto-conical tool engaging surface portions having surface ends which are directed toward each other and which surface ends are relatively narrowly spaced and connected by substantially flat surfaces.

10. The fastener as in claim 9 wherein said surface ends are relatively widely spaced and connected by substantially flat surfaces resulting in lessening said rotary tool wedging with said frusto-conical surface portions.

References Cited

UNITED STATES PATENTS

| | | | |
|---|---|---|---|
| 3,164,055 | 1/1965 | Duffy | 85—32 |
| 3,285,119 | 11/1966 | Dean et al. | 85—45 |
| 755,804 | 3/1904 | Smith | 85—45 |
| 1,075,710 | 10/1913 | Goodwin | 85—45 |
| 1,300,275 | 4/1919 | Johnson | 85—45 |
| 1,327,587 | 1/1920 | Bliss | 85—45 |
| 1,447,564 | 3/1923 | Norlund et al. | 85—45 |
| 1,684,096 | 3/1928 | Hughes | 85—45 |
| 1,874,657 | 8/1932 | Trotter | 85—45 |
| 2,248,695 | 7/1941 | Bradshaw | 85—45 |
| 2,338,023 | 12/1943 | Bugg | 85—45 |
| 2,458,391 | 1/1949 | Lavietes | 85—45 |
| 2,813,450 | 11/1957 | Dzus | 85—45 |

FOREIGN PATENTS

| | | |
|---|---|---|
| 895,237 | 5/1962 | Great Britain. |
| 954,633 | 6/1949 | France. |
| 5,265 | 12/1881 | Great Britain. |
| 556,145 | 9/1943 | Great Britain. |
| 753,367 | 7/1956 | Great Britain. |
| 138,428 | 4/1960 | Russia. |

MARION PARSONS, Jr., *Primary Examiner.*

EDWARD C. ALLEN, *Examiner.*